ative SewingMachine for the# United States Patent [19]

Gude

[11] 3,834,332

[45] Sept. 10, 1974

[54] ARRANGEMENT ON A ZIG-ZAG OR AUTOMATIC SEWING MACHINE FOR THE ADJUSTMENT OF THE STITCH POSITION AND WIDTH OF THE STITCH

[75] Inventor: Gunther Max Gude, Rannungen near Schweinfuri, Germany

[73] Assignee: Meister-Werke GmbH, Schweinfurt, Germany

[22] Filed: June 28, 1972

[21] Appl. No.: 267,109

[30] Foreign Application Priority Data
June 28, 1971 Germany.............................. 2132064

[52] U.S. Cl........................... 112/158 A, 112/158 B
[51] Int. Cl............................................. D05b 3/02
[58] Field of Search ........ 112/158 R, 158 A, 158 B, 112/158 F

[56] References Cited
UNITED STATES PATENTS
2,854,935   10/1958   Bennink et al................... 112/158 D
3,034,461   5/1962   Urscheler......................... 112/158 D
3,041,988   7/1962   Fujita.............................. 112/158 D
3,200,780   8/1965   Eriksson.......................... 112/158 R FOREIGN PATENTS OR APPLICATIONS
1,110,680   4/1968   Great Britain .................. 112/158 B Primary Examiner—Werner H. Schroeder

[57] ABSTRACT

An adjustment device for use on a zig-zag or automatic sewing machine for adjusting the stitching field, wherein the adjusting elements for the stitch position and width of the stitch have a common turnable unit, and a single manual adjusting means is provided for the simultaneous adjustment of the adjusting elements for the adjustment according to choice of all kinds of stitch positions and widths of stitches.

8 Claims, 7 Drawing Figures

ARRANGEMENT ON A ZIG-ZAG OR AUTOMATIC SEWING MACHINE FOR THE ADJUSTMENT OF THE STITCH POSITION AND WIDTH OF THE STITCH

The invention relates to a means on a zig-zag or automatic sewing machine for the adjustment of the stitching field, whereby adjusting elements operated by adjusting means and scanning elements cooperating with said elements are provided for the adjustment of the stitching position and width of the stitch.

In the case of known zig-zag sewing machines or machines with automatic arrangements separate adjusting means are used for the adjustment of the stitch position and width of the stitch each time. Therefore, the operator prior to sewing must adjust the individual components of the zig-zag stitch that is to be made with the use of the specific adjusting means such as handles or levers. At the smae time the operator must keep in mind the components of the stitch that is to be made in order to be able to transfer them as adjusting values to the two adjusting means. Thus, the operator must not only move two adjusting means but must first of all analyze in his mind the desired stitching field in terms of the two components of the pertinent stitch position and width of the stitch. Only then will he be in a position to make the adjustment. Above all, inexperienced individuals easily commit an error in the case of this traditional manner of adjustment, in which the pertinent adjustment is accomplished with the aid of scales on the adjusting levers or handles, and these mistakes are made especially since it is only possible to determine by trial sewing whether the adjusted stitching field corresponds to the way it was imagined by the individual.

In the case of zig-zag sewing machines in which so-called automatic installations are additionally built in, the individual programs for fancy or utility stitches are switched on by a separate adjusting element. In this case, it is an adjusting handle or an operating lever that is available in addition to the adjusting handles for the width of the stitch and the stitch position. This operating lever is adjusted each time for a certain automatic program, but the remaining types of stitches for zig-zag and straight stitched seams can not be adjusted in this manner.

The object of the invention is to facilitate and simplify the operation of a zig-zag or automatic sewing machine in order to avoid mistakes during adjustment.

In the case of the sewing machine according to this invention, this object is achieved by the adjusting curves or elements for the stitch position and width of the stitch constituting a common rotatable unit and having a single adjusting means controllable by hand provided for the simultaneous adjustment of both adjusting curves or elements and thus for the adjustment of all types of stitch positions and widths of the stitch as desired.

Thus it is possible by the operation of a single adjusting means to adjust any desired type of stitch with its components of stitch position and width of the stitch freely during zig-zag sewing. During adjustment of the adjusting means, the adjusting elements for stitch position and width of the stitch are turned at the same time which then causes the adjustment of the pertinent stitch position and width of the stitch and thereby the adjustment of the stitching field by way of a scanning element in a manner known per se.

In another embodiment of this invention the height of the profile of the stitch position element is constantly maintained for a certain stitch position and the profile height for the pertinent element of the width of the stitch can rise from a minimum to a maximum value. Thus it is possible by operation of the adjusting means first of all to adjust the stitch position (left-center-right) and to select within this stitch position upon further adjustment of the adjusting means the desired width of the stitch.

In many cases known zig-zag sewing machines besides having the zig-zag means, still have an arrangement for buttonholes, for which there is a third adjusting curve and a scanning element cooperating with it for adjusting the sewing machine or the needle for making the buttonhole. This buttonhole arrangement in the case of known sewing machines is turned on by means of a special operating lever. In the case of making buttonholes, the two adjusting elements for the stitch position and width of the stitch also become effective. By a further embodiment of this invention it is possible in an advantageous way to make the adjustment of the sewing machine for the making of buttonholes by means of the same adjusting means provided for the stitch position and width of the stitch. According to this invention the third adjusting element needed to make the buttonholes constitutes with the adjusting elements for the stitch position and width of the stitch a common rotatable unit for this purpose. The common adjustment control for the curve of the stitch position and the curve of the width of the stitch also is provided for the adjustment to make buttonholes.

In a preferred embodiment of the invention, given by way of example, the common adjustment control is an adjusting knob that has a scale with symbols for the individual types of stitches and possibly for making buttonholes, and is provided with a fixed indicating arrangement cooperating with the adjusting knob for indicating the type of stitch that is adjusted each time. In this manner the operator can easily adjust to the desired stitch. The operator immediately sees from the symbols of the adjusting knob what the stitch is going to be.

At the same time the indicating device has an indicator window in front of the scale of the adjusting knob, which has the shape of the stitching hole on the foot or on the needle plate of the sewing machine and the symbols on the scale are succeeding identical copies of all sorts of stitches. The symbol of a cetain desired stitch (stitch position and width of stitch or a certain type of stitch for making buttonholes, such as caterpillar or bolt) need only to be moved behind the indicator window by turning the adjusting knob, as a result of which the sewing machine automatically is adjusted to the desired stitch. For simultaneous adjustment of the width of stitch and stitch position the operator merely needs to operate one adjusting knob, whereby, at the same time, the adjusted stitching field becomes visible in the indicator device. This also refers to the symbols or adjusting marks provided on the adjusting knob for the sewing of buttonholes.

The indicating device does not absolutely have to be in front of the scale of the adjusting knob but can also be attached to the outside edge of the adjusting knob, for example on the housing of the sewing machine.

The adjusting arrangement according to the invention can also be used in the case of the initially mentioned zig-zag sewing machines with automatic arrangement, where the automatic arrangement has control disks and scanning elements cooperating with said disks for the various types of stitches, as well as a control element to set the pertinent type of stitch. Heretofore the operating element for automatic adjustment was separated from the operating element for adjustment of the width of the stitch and the stitch position. In further embodiment of this invention the control element for the automatic arrangement is coaxially disposed, relative to the adjusting means for the stitch position and width of the stitch, and is operable independently of these adjusting means. This control element for the automatic arrangement is in driving connection with the scanning means for the control disks of the automatic arrangement. Thus the adjusting means for the stitch position and width of the stitch and the control element for the automatic arrangement are disposed at the same place on the machine, but, despite this, are adjustable independently of one another, so that after setting the desired automatic program it is possible to adjust additionally to the desired width of the stitch and stitch position of this automatic program, as in the case of simple zig-zag sewing, without it being necessary for the operator after adjustment of the automatic mechanism to have to search for the adjusting means to adjust to the stitch position and width of the stitch. In this case the advantage of the sole adjusting means, provided according to this invention, for stitch position and width of stitch in connection with the indicator arrangement according to the invention, becomes particularly noticeable.

In still another embodiment of this invention, the control element for the automatic arrangement is a control grip that is mounted inside the adjusting knob for stitch position and width of the stitch and is rotated independently of the latter. This control grip is equipped with symbols for the individual stitches that can be adjusted upon rotation of the grip in succession to a fixed indicator mark. These symbols on the control grip are identical to the stitches of the automatic arrangement, so that all possible types of stitches or shapes of stitches easily and correctly are set by an inexperienced operator at any single position of the sewing machine. At the indicator mark of the control grip, the operator recognizes the adjusted automatic program and on the indicator device of the adjusting knob at the same time the pertinent adjustment of the stitch position and width of stitch or the corresponding stitch for the making of buttonholes is recognized.

DESCRIPTION OF THE PREFERRED EMBODIMENTS

Figure 1:
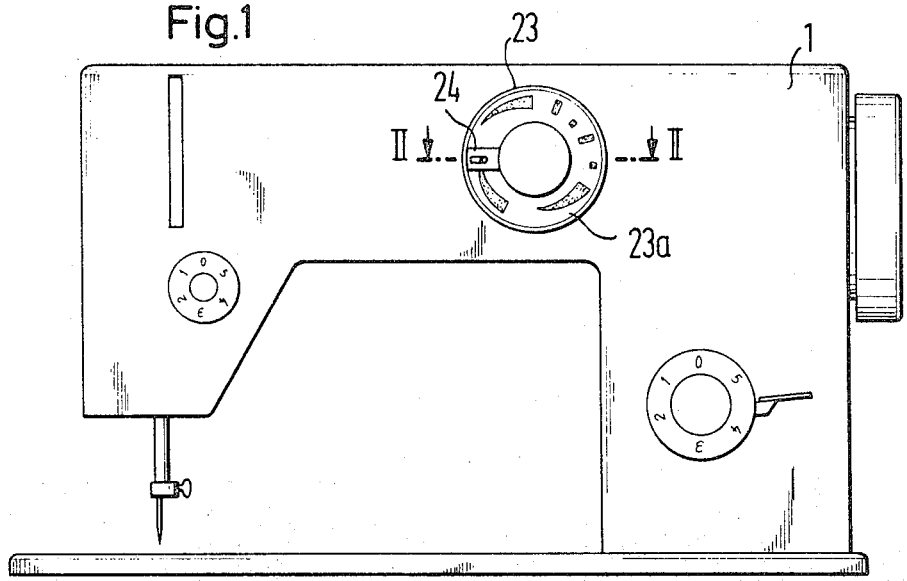
FIG. 1 shows an overall view of a sewing machine from the front in accordance with this invention.
Figure 2:
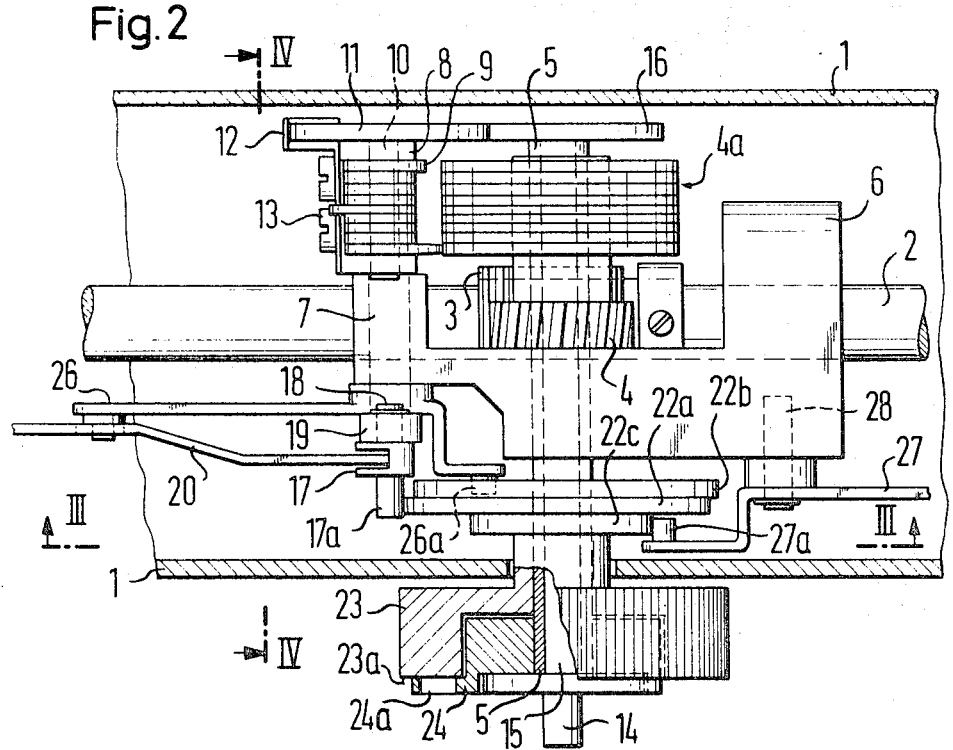
FIG. 2 shows a horizontal cut through the control aggregate following line II—II in FIG. 1.

In the housing 1 of the sewing machine, a worm gear 4 with a certain transmission ratio is driven by a main driving shaft 2 with a worm 3 attached thereon. The transmission ratio is selected so that a packet of control disks 4a connected firmly with worm gear 4 is slowly put into rotation. Worm gear 4 and the packet of control disks 4a are mounted so as to rotate on a common hollow shaft 5, which is fixed in a bearing block 6. The bearing block 6 is firmly attached in housing 1.

A carrier 8 for a scanning finger is swingingly suspended in bearing block 6 by means of a bolt 7. In carrier 8 for the scanning finger, several scanning fingers 9 are disposed on a bolt 10 in a packet. The number of scanning fingers 9 corresponds to the number of control disks 4a and scanning fingers 9 each time are displaced, relative to one another, by the width of control disks 4a. Moreover, scanning fingers 9 are displacedly disposed relative to one another in the shape of a star in the direction of the periphery. The packet of scanning fingers 9 is rotatable together with bolt 10. Furthermore, a stop gear 11 is attached on bolt 10. The star of scanning fingers is prevented from twisting in the position determined in each case by means of a stop spring 12, which is attached by means of screws 13 to carrier 8 of the scanning fingers and fits against the periphery of the stop gear 11.

The star of scanning fingers is pulled toward the packet of control disks 4a by means of a tension spring 29 that is attached on the one hand to housing 1 and on the other hand to a rocker arm or crank support 19, so that each time one scanning finger 9 is in contact with the pertinent control disk 4a.

Control disks 4a with the pertinent scanning fingers 9 constitute the control device for the so-called automatic unit of the sewing machine. Each control disks 4a represents a certain type of fancy stitch. A control grip 14 is provided at the front side of housing 1 for the purpose of adjusting the control disk 4a or its pertinent scanning finger 9 which at any particular time is to become effective, which grip is borne by a bolt 15. Control grip 14 is connected right through hollow shaft 5 with a switching gear 16, which is engaged with stop gear 11. Thus it is possible by turning control grip 14 to influence the position of the star of scanning fingers and to move one scanning finger 9 into operating position according to choice.

Figure 3:
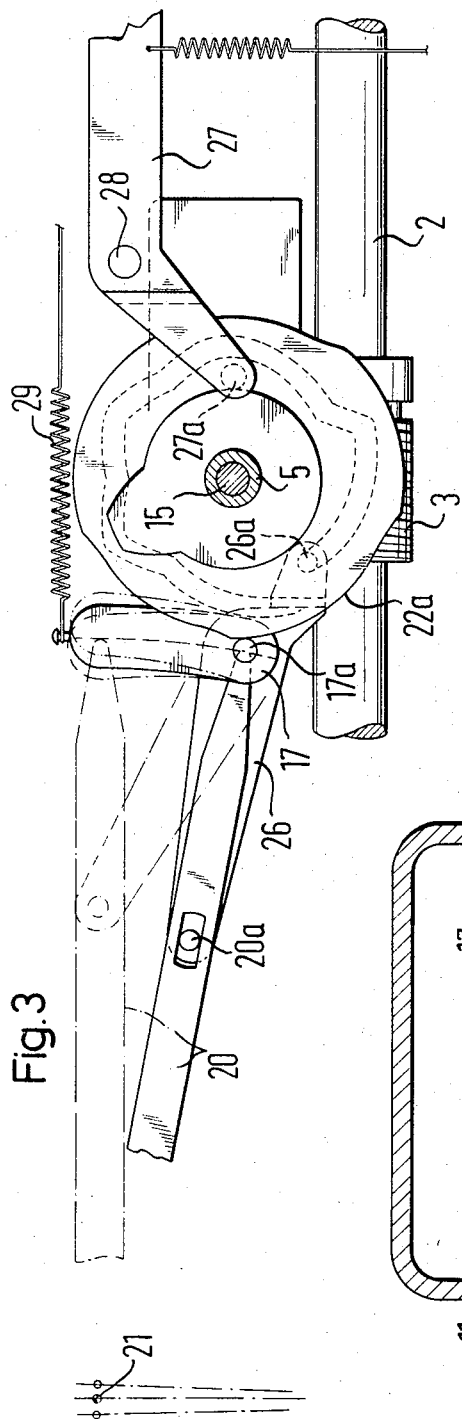
FIG. 3 shows the adjusting mechanism for the width of the stitch and the stitch position in longitudinal section through the machine following line III—III in FIG. 2.
Figure 4:
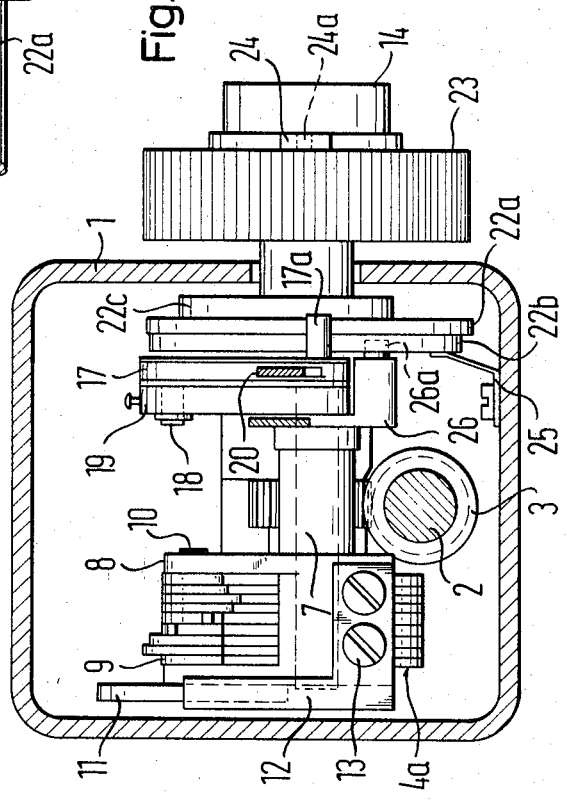
FIG. 4 shows a side view of the control aggregate in cross section according to line IV—IV in FIG. 2.

A rocker arm 17 for the width of the stitch is articulated to rocker arm support 19 by means of a bolt 18 and constitutes a swinging unit by way of bolt 7 together with carrier 8 for the scanning finger and the scanning fingers 9, disposed in the shape of a star. A bar 20 fits positively at one end on the rocker arm of the width of the stitch as a scanning finger. Bar 20 is attached at its other end on a pivotal point 21 (FIG. 3) on a swinging frame of the needle bars. The swinging frame of the needle bars is well-known and for this reason is not specifically drawn.

Three adjusting curves or elements are mounted rotatably on the hollow shaft 5, and to be sure one adjusting element 22a for the stitch position, an adjusting element 22b for the width of the stitch and an adjusting element 22c for the return movement in the case of sewing of buttonholes. These three elements constitute a unit that can be rotated together. They are connected with an adjusting knob 23 which projects from housing 1 of the sewing machine. A spring 25 holds the curves 22a, b, c in the position set in each case.

Figure 5:
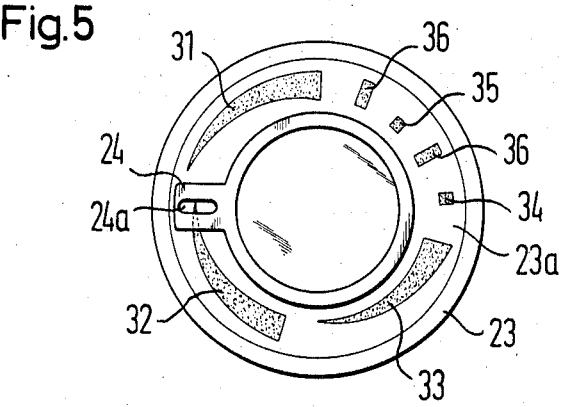
FIG. 5 shows the adjusting knob and the indicator device in the case of an adjustment for a middle straight stitch in accordance with this invention.
Figure 6:
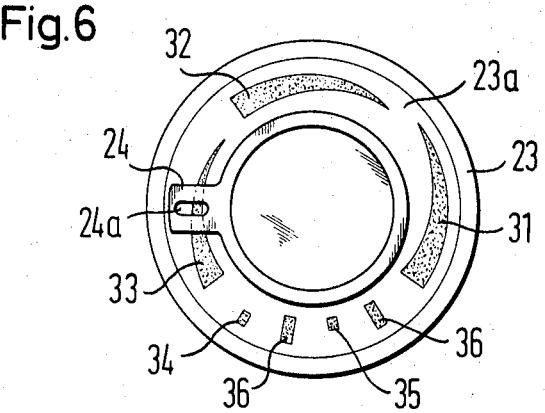
FIG. 6 shows the adjusting knob and the indicator device in the case of adjustment to half the width of a stitch in the right-hand stitch position.
Figure 7:
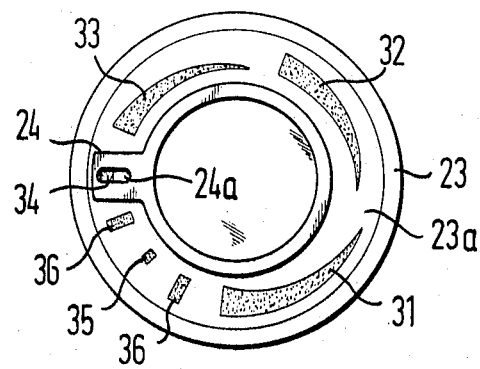
FIG. 7 shows the adjusting knob and the indicator device in the case of adjustment to left-hand buttonhole stitching.

At the front side of adjusting knob 23 there is a scale 23a, as shown in FIGS. 5 to 7. The reference numerals marked correspond in succession each time to the image of the stitch, starting with a straight stitch to the largest width of the stitch, and, of course, reference numeral 31 is for the left stitch position, reference numeral 32 for the center stitch position and reference numeral 33 for the right stitch position. In order to find the same adjusting values, there can be additionally some numerical markings. Besides reference numerals 31, 32, 33, the reference 34 for left buttonhole stitch (caterpillar), 35 for right buttonhole stitching (caterpillar) and 36 for the bolt, which are characteristic for the sewing of buttonholes, are disposed on scale 23a.

An indicator device 24 is attached on hollow shaft 5 in a manner so as to prevent its twisting. This device has an indicator window 24a that is located in front of scale 23a and is identical in regard to its shape to the stitching hole in the foot or the needle plate of the sewing machine. Scale 23a shows through indicator window 24a the stitching picture set each time.

Rocker arm 17 for the width of the stitch fits positively against curve 22a for the stitch position by way of a bolt 17a, through the gradation of which element the pertinent stitch position is determined. The adjustment of the width of the stitch is accomplished by way of an adjusting lever 26 that is on the one hand engaged with the element 22b for the width of the stitch by way of a guide bolt 26a and is articulated on the other hand at a point 20a to the connecting bar.

On the bearing block 6 an additional adjusting lever 27 is mounted on a bolt 28, which on the one hand fits with a scanning bolt 27a positively against the conveying adjusting element 22c and which on the other hand is connected with the conveying adjusting arrangement of the sewing machine, not shown. Adjusting lever 27 serves for the switching on of the return movement in the case of the sewing of buttonholes.

The individual control disks 4a of the packet of control disks are made in such a way that they will move carrier 8 for the scanning fingers by way of the scanning fingers 9 switched on each time individually in the sense of a lateral deflection. Consequently, rocker arm 17 for the width of the stitch, which is connected with carrier 8 for the scanning finger or via bolt 7 and support 19 for the rocker 9, is moved correspondingly. By turning adjusting knob 23, adjusting elements 22a, 22b and 22c are turned, as a result of which the position of bar 20 in rocker arm 17 for the width of the stitch is determined via adjusting lever 26. In this way the deflection of the needle bar for the adjustment of the stitch position and width of the stitch is more or less influenced.

The height of the profile of element 22a for the stitch position is constantly maintained for a certain stitch position each time at the level of the profile, while the level of the profile of the section of element 22b for the width of the stitch that is pertinent in each case changes constantly from a minimum to a maximum value in order to bring about the change of the width of the stitch.

In the case of a zig-zag sewing machine without automatic unit, therefore without any arrangement for fancy stitches, the packet 4a of control disks is left out and is replaced by one control disk for the zig-zag impulse. In this case scanning fingers 9 likewise are omitted, which are replaced by one scanning finger. Since this scanning finger always remains in the operating position, the switching arrangement, which is constituted by the control grip 14, bolt 15 and switch gear 16, in this case also is omitted.

Control grip 14 in the case of an automatic sewing machine has the symbols for the individual stitches. These symbols are not shown in the drawing. By turning grip 14 each time one symbol is adjusted to a fixed indicator mark, which likewise is not drawn.

Obviously, the embodiments shown are exemplary only and a wide variety of embodiments may be devised without departing from the spirit and scope thereof.

What is claimed is:

1. An adjustment device for a sewing machine for adjusting the stitching field, comprising a first adjusting element for adjusting the stitch position to various different positions and a second adjusting element for adjusting the width of the stitch from zero to full width, said first and second adjusting elements constituting a single rotatable unit, and a single manually rotatable adjustment control connected to said rotatable unit for simultaneously adjusting, when rotated, said first and second adjusting elements for a certain selected stitch position and the width of stitch within the range of zero to full width at each of said selected positions.

2. An adjustment device according to claim 1, wherein said first and second adjusting elements include first and second adjustment curves having profiles, the level of the profile of said first adjustment curve being maintained constant for a certain stitch position and the level of the profile of said second adjustment curve steadily rising from a minimum to a maximum value.

3. An adjustment device according to claim 1, and further comprising a third adjusting element, and a scanning element cooperating with said third adjusting element for the adjustment of the sewing machine for the sewing of buttonholes, said third adjusting element together with said first and second adjusting elements constituting said single rotatable unit, and said adjustment control also adjusting said third adjusting element, when rotated, for the adjustment of the sewing machine for the sewing of buttonholes.

4. An adjustment device according to claim 1, wherein said adjustment control comprises an adjusting knob having a scale of symbols therearound for the individual types of stitches, and a fixed indicating means cooperating with said adjusting knob to indicate the type of stitch at each adjustment of said adjusting knob.

5. An adjustment device according to claim 4, wherein said indicating means is provided with an indicator opening in front of said scale of symbols on said adjusting knob, said opening having a shape corresponding to the stitching hole on the needle plate of the sewing machine, and said symbols on said scale being representations of the individual types of stitches.

6. An adjustment device according to claim 1, wherein the sewing machine is an automatic sewing machine having control disks and scanning means for various types of stitches cooperating with said disks, and further comprising a control element disposed coaxially of said adjustment control and rotatable independently thereof; said control element being operably connected to the scanning means for scanning the control disks for determining the desired type of stitch.

7. An adjustment device according to claim 6, wherein the control disks are disposed coaxially to said first, second and third adjusting elements and the axes of the scanning means are offset therefrom.

8. An adjustment device according to claim 6, wherein said control element includes a control grip mounted coaxially with said adjustment control and rotatable independently thereof, said control grip having symbols therearound for the individual types of stitches and further comprising a fixed indicator mark for indicating one symbol after another upon rotating said control grip.

* * * * *